United States Patent [19]

Keeton

[11] Patent Number: 4,924,786
[45] Date of Patent: May 15, 1990

[54] SEED DISPENSER WITH DUAL-FACED SEED PLATE

[76] Inventor: Eugene G. Keeton, 2180 Bells Chapel Rd., Trenton, Ky. 42286

[21] Appl. No.: 366,006

[22] Filed: Jun. 14, 1989

[51] Int. Cl.$^5$ .................... A01C 7/04; B65G 29/02
[52] U.S. Cl. .................................. 111/184; 221/277
[58] Field of Search ............... 111/177, 178, 183, 184,
111/185, 77; 221/266, 263, 277

[56] References Cited

U.S. PATENT DOCUMENTS

| 3,796,346 | 3/1974 | Ribonlean | 111/185 |
| 4,162,744 | 7/1979 | Barker | 221/266 |
| 4,450,979 | 5/1984 | Deckler | 221/263 |

FOREIGN PATENT DOCUMENTS 2376608  8/1978  France ................... 111/185

Primary Examiner—Danton D. DeMille
Attorney, Agent, or Firm—Henderson & Sturm

[57] ABSTRACT

A seed dispenser for agricultural planters has a casing forming a seed-receiving chamber and within the chamber, turning on a transverse axis, is a seed plate or wheel having seed-receiving cells on both radial faces. The wheel is in effect a rotating partition which divides the chamber into right and left compartments. One of the compartments receivers seed, as from a hopper, and the wheel has one or more through openings so that the seed flows from the one compartment to the other. Both compartments lead to a seed outlet through which seeds are discharged to the ground, furrow, etc. The arrangement doubles the output of seed from the dispenser and thus enables more efficient planting according to modern agricultural methods.

19 Claims, 4 Drawing Sheets

SEED DISPENSER WITH DUAL-FACED SEED PLATE

BACKGROUND AND SUMMARY OF THE INVENTION

Seed dispensers of many types are, of course, known in the agricultural planter art, some including horizontal seed plates turning on vertical axes and others including vertical plates or wheels turning on horizontal axes. The latter have many advantages over the former but both types have certain drawbacks, among which is the inability to discharge seeds in sufficient volume and at reasonable speeds to conform to modern high-speed farming operations. The present invention is directed mainly to solutions to the problems existing in current designs of vertical wheel dispensers.

It is a feature of the invention to provide a casing or housing having walls defining a chamber that is divided into two compartments by a circular seed plate or wheel that rotates on a horizontal axis. One of the compartments receives seed, as from a hopper carried by the planter frame, and the wheel has one or more through openings enabling the seed to flow through to the other compartment. Thus the seed feeding means supplies both compartments and the seed wheel or plate has seed-receiving cells at both radial faces for receiving seed from the respective compartments, both of which lead to a seed outlet for delivering seed to the ground, furrow, etc. The dispenser includes means for holding the seed level in the compartments at a desirable height.

A further significant feature is that the seed cells at one side of the plate are staggered angularly with respect to those at the other side of the plate, thus enabling the use of a plate rim of relatively narrow cross section. The cells at both sides are alike to the extent of being mirror images of each other and the shapes and dimensions of the cells are based on the size and shape of the seeds being handled. The plate is interchangeable with others adapted for handling seed of other configurations. The present design is based preferably on the practice of one seed per cell.

The invention features also a trough or gutter provided in the cylindrical wall or band of the casing, the wheel or plate running midway between opposite sides of the trough, which is wider in a cross-wise direction at its bottom to facilitate entry of seed into the cells but which converges to a high part of the cylindrical wall for better cooperation with internal means for confining the seeds to the cells until the seeds reach a predetermined area for rapid, positive release from the plate and into the seed-delivery outlet, release being also assisted by centrifugal force.

On the whole, the preferred construction is of relatively light-weight, high-strength materials capable of functioning over long periods of time at substantially high speeds consistent with accurate planting.

Further features and advantages of the invention will appear as the disclosure progresses.

DETAILED DESCRIPTION OF A PREFERRED EMBODIMENT OF THE INVENTION

Figure 1:
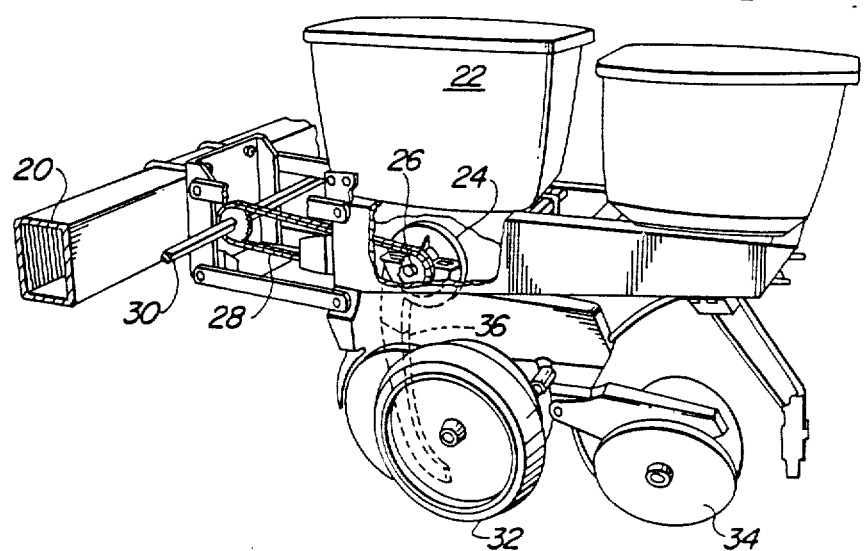
FIG. 1 is a small-scale perspective of a representative agricultural planter, with a portion broken away to reveal the exterior of the novel dispenser and the drive therefor.

Reference will be had first to FIG. 1 for an overview of the invention in its preferred environment. In that Figure, the numeral 20 designates the tool bar of a typical planter having front and rear hoppers, the front one, at 22, containing seed for ultimate delivery to a casing 24 which contains the inventive structure, the details of which will appear subsequently herein.

Figure 2:
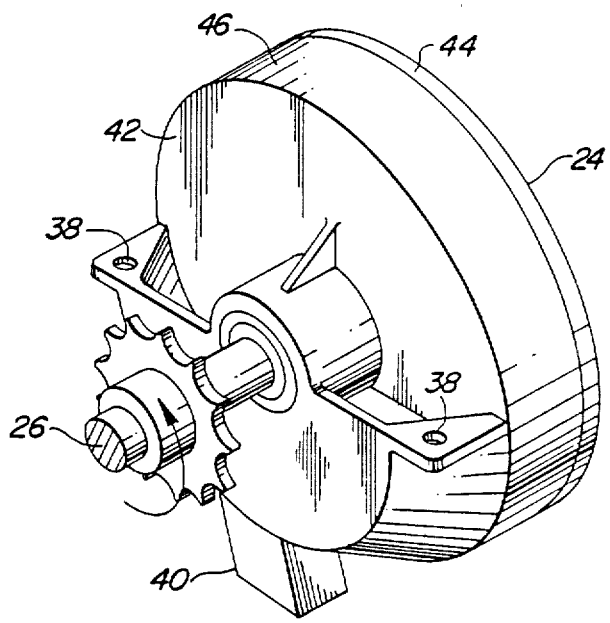
FIG. 2 is an enlarged perspective of the dispenser.

The casing journals a horizontal cross shaft 26 which is here shown as being chain-driven at 28 from a transverse shaft 30 carried by the tool bar. Also as representative of typical known planters, the present planter includes press wheels 32 and covering wheels 34. A seed tube 36 leads from the casing 24 to between the press wheels, again in conventional fashion. As seen in FIG. 2, the exterior of the casing 24 is configured to include mounting ears 38 and a depending seed outlet 40 that is connected to the delivery tube 36. The ears are used for mounting the casing on the planter frame, details not significant here.

Figure 3:
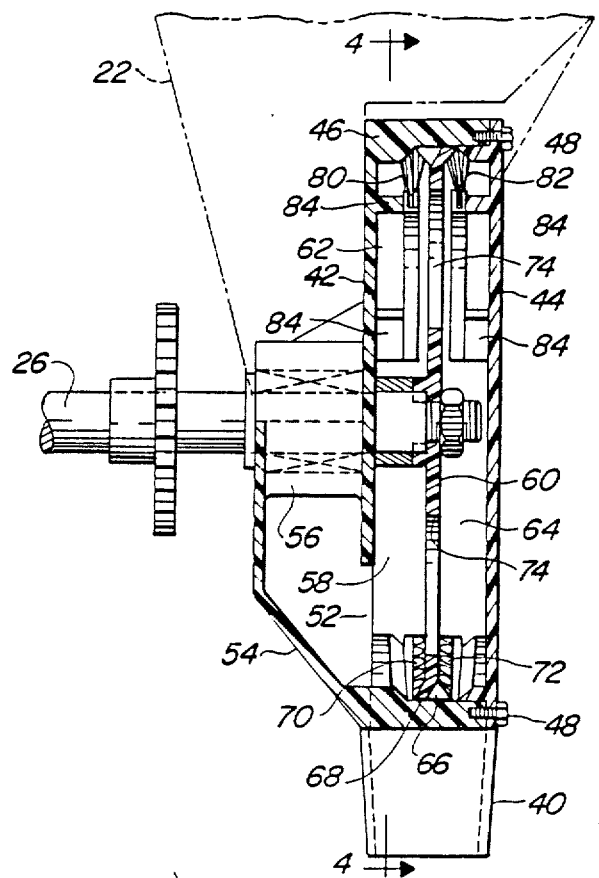
FIG. 3 is an enlarged transverse section through the dispenser.

The casing is made up of first and second upright parallel walls 42 and 44 spanned by and joined to a band-like or cylindrical wall 46. In a preferred design, the upright wall 42 may be formed integrally with the cylindrical wall and the wall 44 is made removable to provide access to the interior of the casing, removability being shown by the cap screws 48 (FIGS. 3, 10 and 11) and tapped bores 50 (FIG. 12). FIG. 3 best shows that the wall 42 has a seed inlet 52 in a lower portion thereof, formed by a tapering wall part 54 to which the hopper 22 delivers via the seed tube 36. It is also seen in this Figure that a low-friction bearing 56 spans the wall 42 and wall portion 54 for journalling the shaft 26 which projects into a chamber 58 formed by the casing. A circular seed wheel or plate 60 is fixed to the chamber-received end of the shaft and is disposed midway between the walls 42 and 44, in effect providing a rotatable partition that divides the chamber 58 into first and second compartments 62 and 64, respectively. These compartments are virtually mirror images of each other.

The seed plate has a circular rim 66 which runs in close relation to the interior of the cylindrical wall 46, which, in the main is formed with or has an arcuate concentric trough 68 centered on the median plane of the seed plate and in which the seed plate rim travels. The trough is, of course, open to both compartments 62 and 64 and has oppositely inwardly sloping sides to facilitate the entry of seeds into oppositely disposed circular series of seed cells 70 and 72 provided respectively at opposed radial faces of the seed plate, particularly in the plate rim. The cells 70 face and receive seeds from the compartment and the cells 72 face and receive seeds from the compartment 64, the seeds naturally gravitating to the lower parts of the compartments, best seen in FIGS. 4 and 10. The sloping sides of the trough, as said, assure that the seeds enter the respective cells.

At this point, a significant feature of the invention should be noted, and that is that the seed feed means, considered broadly, enables the feed of seeds to both compartments 62 and 64. This results from the provisions of openings 74 (here two) in the seed plate. Each opening is preferably non-circular, here shown as being oval or elliptical, each having its longer arcs oblique to an adjacent radius of the plate, the longer arcs being effective to agitate the seeds and enhance the flow thereof from the compartment 62 to the compartments 64. In practice, the seeds will collect in substantially even volumes at both sides of the wheel to a level generally on the order of the line 76 in FIG. 4, which is at about the top of the lowermost through opening 74. Because of the rotation of the seed plate during delivery of seeds to the outlet 40, the seed level will remain about the same, depending upon the adequacy of the supply from the hopper 22.

To revert to the seed cells in the plate: These have the size and shape of the type of seeds being planted, and the dispenser is especially adapted to seeds of substantially spherical or ellipsoidal shapes. Consequently, the cells are of uniform size and shape according to the criterion just mentioned and are mirror images of each other. The cells of both circular series open radially outwardly to the cylindrical wall as well as opening laterally to their respective compartments. The cell design assures efficient seed pick-up and rapid release for delivery to the seed outlet 40.

Figure 4:
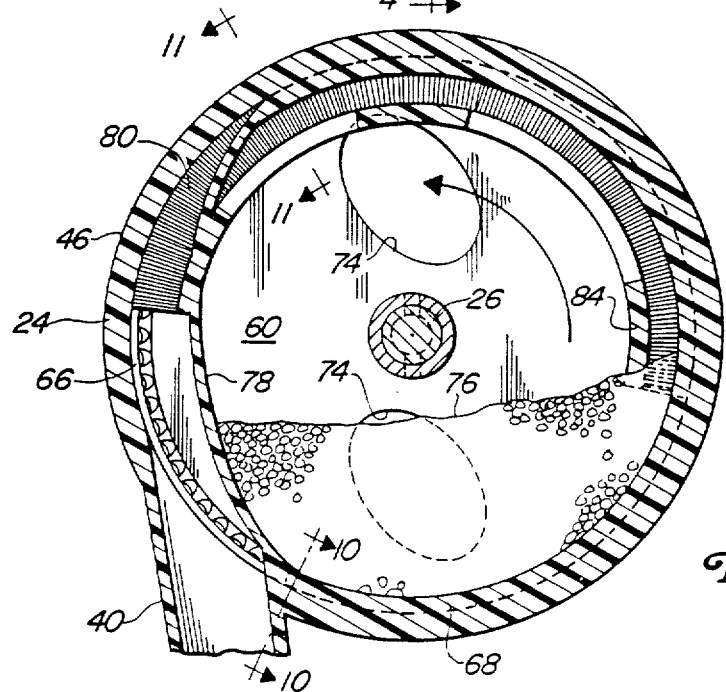
FIG. 4 is a section as seen on the line 4—4 of FIG. 3.
Figure 5:
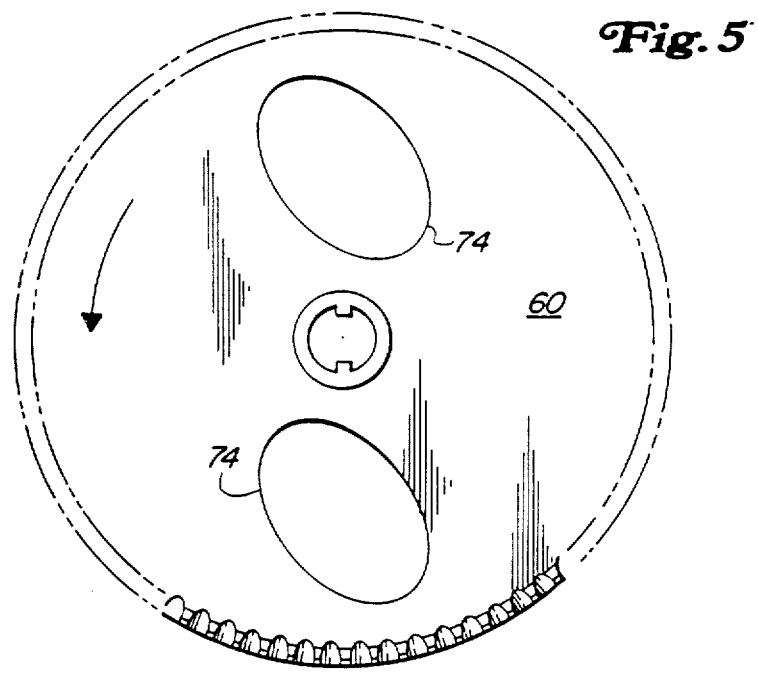
FIG. 5 is a face view of one side of the seed plate or wheel.
Figure 6:
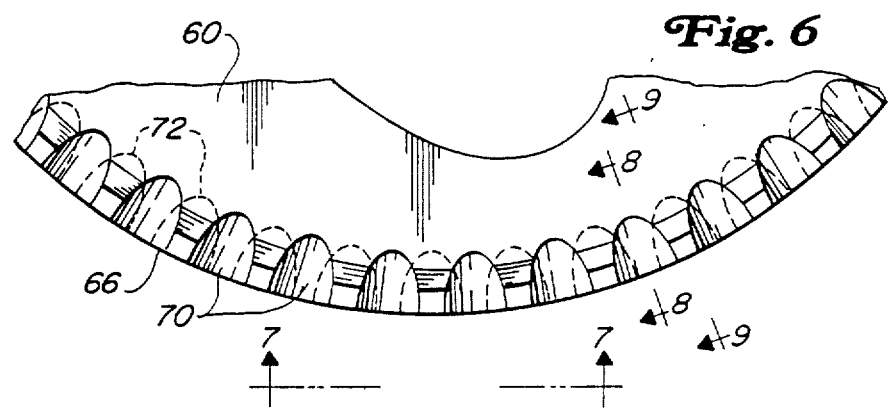
FIG. 6 is an enlarged partial view of the bottom area of the seed plate.
Figures 7, 8, 9:
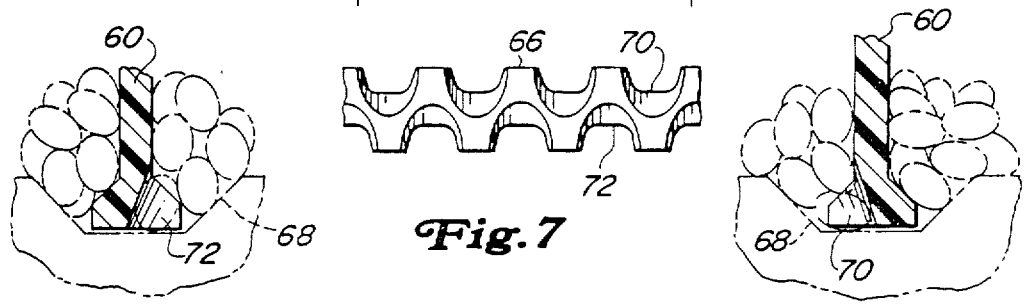
FIG. 7 is a fragmentary end view as seen along the line 7—7 of FIG. 6.
FIG. 8 is a section along the line 8—8 of FIG. 6.
FIG. 9 is a section along the line 9—9 of FIG. 6.

Looking at FIG. 12, the arrow shows that the direction of rotation of the seed plate, or travel of seeds carried by the plate, is clockwise. The outlet is here shown as being disposed in the area generally about between four and five o'clock. In FIG. 4, which shows the opposite side of the structure, where the seed travel is counterclockwise the outlet appears at about between seven and eight o'clock. In order that the seeds in the lower parts of the compartments 62 and 64 do not move directly to the outlet but must await conveyance by the plate 60, a cross barrier 78 is established, which is split so as to exist in both compartments (See FIG. 12). This barrier has a lower end affixed to the bottom of the trough 68 at about four o'clock (about seven o'clock in FIG. 4) and rises to a high elevation, adjoining the cylindrical wall generally at about eleven o'clock (FIG. 4). As the seed plate rotates and carries seed from the lower parts of the compartments toward the outlet 40, the seeds are retained in their respective cells by seed-confining means 80 and 82 respectively in the compartments. Each confining means here takes the form of an arcuate series of bristles 80 and 82, one series affixed to each compartment in any suitable manner as at 84 (FIGS. 3 and 11). Each series of bristles terminates just angularly past the top part of the barrier 78 (FIG. 4), whereupon the cell-carried cells are released for discharge into the outlet 40, assisted by centrifugal force.

Figure 10:
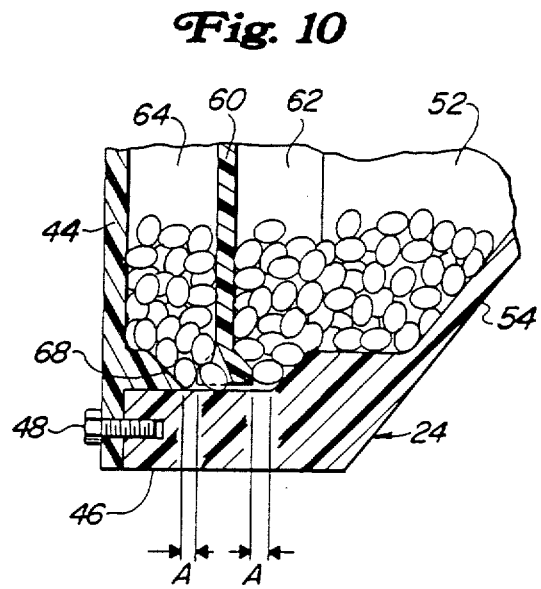
FIG. 10 is an enlarged section of the lower part of the casing.
Figure 11:
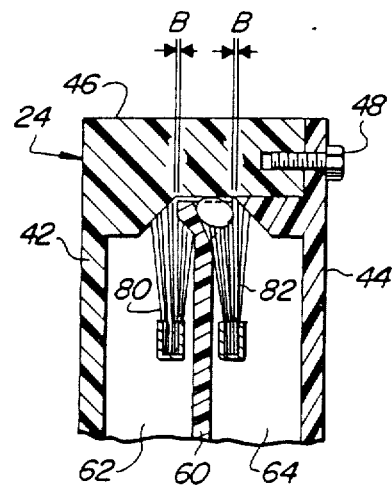
FIG. 11 is an enlarged section of the upper part of the casing.
Figure 12:
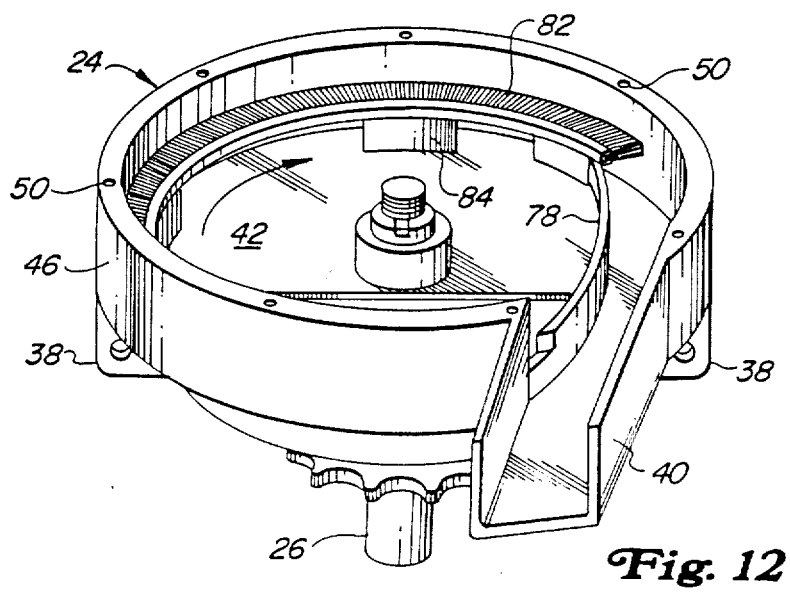
FIG. 12 is a perspective of the casing by itself, with the seed plate and other parts removed in order to show part of the seed-confining means.

It is still another feature of the invention that the width of the trough 68 is greater at its bottom than it is at its top, best noted by comparing the dimensions A—A in FIG. 10 with those at B—B in FIG. 11. The angular convergence of the trough enhances the retention of the picked-up seeds in the seed cells until released as explained above.

The totality of features provides a seed dispenser that enables relatively high-volume delivery of seeds without an intolerable increase in rotational or ground speeds. The through openings in the seed plate not only provide for the flow of seeds from one compartment to the other but are so designed and located as to maintain a maximum desirable level of seeds in the compartments. The casing and related parts may be made of any suitable material having the characteristics of low weight, high strength and resistance to corrosion. Features and advantages other than those pointed out will readily occur to those versed in the art, as will many modifications and alterations in the preferred embodiment disclosed, all without departure from the spirit and scope of the invention.

I claim:

1. A planter seed dispenser, comprising: means providing a chamber having a cylindrical wall about a transverse horizontal axis and axially spaced apart side walls joined to the cylindrical wall, a circular seed plate having a continuous peripheral portion in close-running relation to the interior of the cylindrical wall and journalled within the chamber on the aforesaid axis and disposed midway between the side walls as a rotating partition completely dividing the chamber into first and second separate compartments, said plate having first and second separate sets of seed receiving cells, said first set of seed receiving cells disposed on one face of the seed plate and the second set of seed receiving cells disposed on the other face of the seed plate, the first and second sets of seed receiving cells receive seed respectively from the first and second compartments, means for supplying seed to both compartments, and seed outlet means in the casing and leading from both compartments.

2. The seed dispenser according to claim 1, in which the seed-supplying means is operative to feed seed to both compartments substantially simultaneously.

3. The seed dispenser according to claim 1, in which each cell opens radially outwardly to the cylindrical wall as well as laterally to the associated compartment.

4. The seed dispenser according to claim 1, in which the seed-receiving cells at both sides of the plate are substantially identical.

5. The seed dispenser according to claim 4, in which the cells at both sides of the plate are arranged in a circle of uniformly angularly spaced cells and the cells in the circle at one side of the plate are angularly staggered relative to the cells at the other side of the plate.

6. A planter seed dispenser comprising: means providing a chamber having a cylindrical wall about a transverse horizontal axis and axially spaced apart side walls joined to the cylindrical wall, a circular seed plate journalled within the chamber on the aforesaid axis and disposed midway between the side walls as a rotating partition completely dividing the chamber into first and second separate compartments, said plate having first and second separate sets of seed receiving cells, said first set of seed receiving cells disposed on one face of the seed plate and the second set of seed receiving cells disposed on the other face of the seed plate, the first and second sets of seed receiving cells receive seed respectively from the first and second compartments, means for feeding seed to one compartment, the plate having an opening therethrough for enabling movement of seed to the other compartment, and means in the casing providing a common seed outlet for both compartments.

7. A planter seed dispenser, comprising: a casing having first and second upright walls and a cylindrical wall spanning and joined to the upright walls to form a chamber, the first upright wall having an inlet at a lower part thereof for conducting seed of uniform size and shape to the chamber; a circular plate journalled within the chamber for clockwise rotation about an axis that is the center of the cylindrical wall and disposed midway between the upright walls as a rotating partition dividing the chamber into first and second compartments, the plate further having an opening therethrough radially offset from the axis of rotation and via which seed from the inlet is distributed to lower parts of both compartments, the plate further having an annular rim in close-running relation to the cylindrical wall and the rim having first and second opposite sides lying respectively in the first and second compartments, each side of the rim having therein a plurality of uniformly angularly spaced apart seed-receiving cells configured as to size and shape according to the size and shape of seeds fed through the inlet and the opening in the plate so that the cells at both sides of the plate rim receive seeds respectively at lower parts of the compartments; the cylindrical wall having an outlet at about between four and five o'clock and leading downwardly from both compartments; first and second cross barriers respectively in the compartments and rising from lower ends at about five o'clock to upper ends at respectively higher parts of the compartments so as to separate the outlet from direct communication with the lower parts of the compartments whereby seeds carried by the plate pass the upper parts of the barrier for discharge through the outlet; and seed-confining means fixed in both compartments and cooperative with the plate for confining seeds to the respective cells until the cells successively pass the upper ends of the barrier.

8. The seed dispenser according to claim 7, in which the opening in the plate is non-circular so as to better agitate the seeds and facilitate passage of seeds through the opening.

9. The seed dispenser according to claim 8, in which the opening in the plate is oval.

10. The seed dispenser according to claim 7, in which the plate includes a second through opening spaced angularly from the first-mentioned opening in the plate.

11. The seed dispenser according to claim 10, in which the plate openings are non-circular so as to better agitate the seeds and facilitate passage of seeds through the openings.

12. The seed dispenser according to claim 11, in which the openings are oval.

13. The seed dispenser according to claim 7, in which the cells at one side of the plate rim are angularly offset from the cells at the other side of the rim.

14. The seed dispenser according to claim 13 in which each cell opens radially outwardly to the cylindrical wall as well as laterally to the associate compartment.

15. The seed dispenser according to claim 7, in which the cylindrical wall has an interior concentric trough and the rim of the plate runs centrally in the trough whereby to facilitate entry of seeds from the compartments into the respective cells.

16. The seed dispenser according to claim 15, in which the trough sides converge from a lower part thereof to an upper part thereof to better confine the seeds to the cells at upper parts of the rim.

17. The seed dispenser according to claim 16, in which the convergence of the trough is uniform at opposite sides of the rim.

18. The seed dispenser according to claim 15, in which the trough is wider at the lower parts of the sub-chambers and narrower in the area of the seed-confining means.

19. The seed dispenser according to claim 7, in which the sub-chambers are substantially mirror-images of each other.

* * * * *

UNITED STATES PATENT AND TRADEMARK OFFICE
CERTIFICATE OF CORRECTION

PATENT NO. : 4,924,786

DATED : May 15, 1990

INVENTOR(S) : Eugene G. Keeton

It is certified that error appears in the above-identified patent and that said Letters Patent is hereby corrected as shown below:

In the Abstract, Line 7 "receivers" should read --receives--. Column 4, Line 57 after "plate" insert --having a continuous peripheral portion in close-running relation to the interior of the cylindrical wall and--.

Signed and Sealed this

Twenty-fifth Day of February, 1992

Attest:

HARRY F. MANBECK, JR.

Attesting Officer

Commissioner of Patents and Trademarks